(12) United States Patent
Narisawa et al.

(10) Patent No.: US 10,242,835 B2
(45) Date of Patent: Mar. 26, 2019

(54) HARNESS HOLDER, POWER EQUIPMENT UNIT, AND VEHICLE

(71) Applicant: HONDA MOTOR CO., LTD., Tokyo (JP)

(72) Inventors: Masato Narisawa, Saitama (JP); Masashi Abe, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/697,584

(22) Filed: Sep. 7, 2017

(65) Prior Publication Data

US 2018/0075996 A1  Mar. 15, 2018

(30) Foreign Application Priority Data

Sep. 13, 2016 (JP) ................... 2016-178644

(51) Int. Cl.
| | |
|---|---|
| *H02G 3/08* | (2006.01) |
| *H01H 85/22* | (2006.01) |
| *H01H 85/20* | (2006.01) |
| *H01H 85/25* | (2006.01) |
| *B60K 1/04* | (2019.01) |

(Continued)

(52) U.S. Cl.
CPC ............... *H01H 85/22* (2013.01); *B60K 1/04* (2013.01); *B60R 16/0215* (2013.01); *H01H 85/2045* (2013.01); *H01H 85/25* (2013.01); *B60R 16/03* (2013.01); *H01H 2085/208* (2013.01); *H01H 2085/209* (2013.01)

(58) Field of Classification Search
CPC .... H01H 85/22; H01H 85/2045; H01H 85/25; H01H 2085/208; H01H 2085/209; B60R 16/03; B60R 16/0215; B60R 16/02; B60R 16/0207; B60K 1/04; H02G 3/04; H02G 3/00; H02G 3/02; H02G 3/08
USPC ............. 174/50, 520, 72 A, 113 R; 318/139; 439/76.1, 76.2; 361/600, 601; 248/68.1
See application file for complete search history.

(56) References Cited

U.S. PATENT DOCUMENTS

| | | | |
|---|---|---|---|
| 6,575,760 B2* | 6/2003 | Doshita | ................. B60R 16/027 174/72 A |
| 6,997,499 B2* | 2/2006 | Tsubaki | ............... B60N 2/0224 174/72 A |

(Continued)

FOREIGN PATENT DOCUMENTS

| | | |
|---|---|---|
| JP | 2001-057720 A | 2/2001 |
| JP | 2001-128333 A | 5/2001 |

(Continued)

OTHER PUBLICATIONS

Mar. 13, 2018, Japanese Office Action issued for related JP Application No. 2016-178644.

*Primary Examiner* — Angel R Estrada
(74) *Attorney, Agent, or Firm* — Paratus Law Group, PLLC

(57) ABSTRACT

A harness holder for holding a harness therein, includes: a holder main body whose upper portion is open; a holder cover which covers the upper portion of the holder main body. The holder main body has a reinforced part which extends from a bottom of the holder main body toward the upper portion thereof and which is integrally provided on the holder main body, and the holder cover has an opening through which the reinforced part passes.

4 Claims, 10 Drawing Sheets

(51) Int. Cl.
*B60R 16/02* (2006.01)
*B60R 16/03* (2006.01)

(56) References Cited

U.S. PATENT DOCUMENTS

| | | | | |
|---|---|---|---|---|
| 8,267,357 | B2 * | 9/2012 | Kataoka | H02G 3/088 |
| | | | | 248/68.1 |
| 8,481,856 | B2 * | 7/2013 | Yamaguchi | B60R 16/0207 |
| | | | | 174/113 R |
| 8,525,029 | B2 * | 9/2013 | Kato | B60R 16/0215 |
| | | | | 174/113 R |
| 2016/0141586 | A1 | 5/2016 | Fujii et al. | |
| 2016/0248235 | A1 | 8/2016 | Itou | |

FOREIGN PATENT DOCUMENTS

| | | |
|---|---|---|
| JP | 2010-027242 A | 2/2010 |
| JP | 2016-097700 A | 5/2016 |
| WO | WO2015/056551 A1 | 4/2015 |

* cited by examiner

HARNESS HOLDER, POWER EQUIPMENT UNIT, AND VEHICLE

CROSS-REFERENCE TO RELATED APPLICATION(S)

This application claims priority from Japanese Patent Application No. 2016-178644 filed on Sep. 13, 2016, the entire contents of which are incorporated herein by reference.

FIELD

The present invention relates to a harness holder, a power equipment unit, and a vehicle.

BACKGROUND

High voltage system equipment such as a battery (power equipment), an inverter (a power converter), or an ECU (a controller) is mounted in a vehicle such as a hybrid vehicle that travels with a combination of an engine and a motor, an electric vehicle that travels using a motor alone, or the like. These pieces of high voltage system equipment are electrically connected via high voltage wiring (a harness). The high voltage wiring is preferably protected using a harness holder to avoid damage (e.g., see WO2015/056551).

In the related art, however, the harness holder includes a holder main body whose upper portion is open, and a holder cover that covers the upper portion of the holder main body. Since the surroundings of the high voltage wiring housed in the harness holder are merely covered by the holder main body and the holder cover, when the harness holder receives a great shock in the event of vehicle collision, a function of protecting the high voltage wiring may be damaged. For example, when the harness holder is disposed below a seat rail for a seat, the seat rail may enter the harness holder in the event of vehicle collision so that the high voltage wiring is damaged.

SUMMARY

The present invention is to provide a harness holder capable of protecting a harness from a shock in the event of vehicle collision, a power equipment unit, and a vehicle.

The invention provides following aspects (1) to (8).

(1) A harness holder (e.g., a harness holder 120 in embodiment) for holding a harness therein, including:
a holder main body (e.g., a holder main body 130 in embodiment) whose upper portion is open;
a holder cover (e.g., a holder cover 140 in embodiment) which covers the upper portion of the holder main body,
wherein the holder main body has a reinforced part (e.g., reinforced parts 134 in embodiment) which extends from a bottom (e.g., a base 131 in embodiment) of the holder main body toward the upper portion thereof and which is integrally provided on the holder main body, and
the holder cover has an opening (e.g., openings 142 in embodiment) through which the reinforced part passes.

(2) The harness holder according to (1),
wherein the holder cover has a positioning part (e.g., a positioning part 143 in embodiment) that extends outward from the harness holder to position the harness, and
the positioning part is rotatable relative to the holder cover.

(3) The harness holder according to (1) or (2),
wherein the reinforced part is configured such that a top thereof is disposed at a higher position than the holder cover.

(4) A power equipment unit (e.g., a power equipment unit 20 in embodiment) including:
a power equipment (e.g., a battery 50 in embodiment) which supplies electric power to a motor (e.g., a motor generator 3b in embodiment);
a controller (e.g., an ECU 70 in embodiment) which controls the power equipment; and
a harness (e.g., a control system harness 100 in embodiment) which connects the power equipment and the controller,
wherein a part (e.g., a second harness part 102 in embodiment) of the harness is housed in a harness holder (e.g., a harness holder 120 in embodiment), and
the harness holder includes:
a holder main body (e.g., a holder main body 130 in embodiment) whose upper portion is open;
a reinforced part (e.g., reinforced parts 134 in embodiment) which is integrally provided on the holder main body and which extends from a bottom (e.g., a base 131 in embodiment) of the holder main body toward the upper portion thereof; and
a holder cover (e.g., a holder cover 140 in embodiment) which covers the upper portion of the holder main body and which has an opening (e.g., openings 142 in embodiment) through which the reinforced part passes.

(5) The power equipment unit according to (4),
wherein a power converter (e.g., an inverter 60 in embodiment) which converts the electric power of the power equipment is disposed to be adjacent to the power equipment, and
the harness holder is disposed around a border between the power equipment and the power converter to extend in a direction perpendicular to an arranging direction of the power equipment and the power converter.

(6) The power equipment unit according to (5),
wherein the harness holder is disposed above the power equipment,
a control line (e.g., a PCU control line 94 in embodiment) which is connected to the power converter is housed in the harness holder,
the holder cover has a positioning part (e.g., a positioning part 143 in embodiment) that positions the control line with respect to the power converter; and
the positioning part is rotatable relative to the holder cover.

(7) A vehicle (e.g., a vehicle 1 in embodiment) in which the power equipment unit according to any one of (4) to (7) is mounted,
wherein the power equipment unit is housed in a power equipment unit housing (e.g., a power equipment unit housing 4a in embodiment) which is formed in a recessed manner in a floor panel (e.g., a floor panel 4 in embodiment), and
the power equipment unit housing is provided below a seat (e.g., front seats 5 in embodiment).

(8) The vehicle according to (7),
wherein the harness holder is disposed below seat rails (e.g., seat rails 5a in embodiment) of the seat.

According to the aspect (1), the reinforced part extending upward from the bottom is integrally provided on the holder main body of the harness holder, and the holder cover of the harness holder has the opening through which the reinforced part passes. Thus, while the shock in the event of the collision of the vehicle is being received by the reinforced part, the received shock is propagated to another strength component. Thereby, the harness housed in the harness holder can be protected, and damage to the harness can be prevented.

According to the aspect (2), the holder cover has the positioning part that extends outward from the harness holder to position the harness, and the positioning part can be rotated relative to the holder cover. Thus, the positioning part is merely rotated without removing the entire harness holder, and thereby the component becoming a connection counterpart of the harness can be removed.

According to the aspect (3), since the top of the reinforced part has a higher position than the holder cover, a shock in the event of collision of the vehicle can be received by the reinforced part ahead of the holder cover.

According to the aspect (4), in the power equipment unit, the harness can be protected against the shock in the event of the collision of the vehicle.

According to the aspect (5), in the power equipment unit, since the harness holder is disposed around the border between the power equipment and the power converter to extend in a direction perpendicular to an arranging direction of the power equipment and the power converter, the harness holder can be disposed by effectively using a space inside the power equipment unit.

According to the aspect (6), in the power equipment unit, the positioning part is merely rotated without removing the entire harness holder, and thereby the power converter can be removed.

According to the aspect (7), in the vehicle, the power equipment unit is housed in the power equipment unit housing formed in a recessed manner in the floor panel, and the power equipment unit housing is provided below the front seat. Thus, the power equipment unit is disposed inside a passenger compartment for which collision protection is considered, so that the power equipment or the harness inside the power equipment unit can be reliably protected.

According to the aspect (8), since the harness holder is disposed below the seat rails of the front seat, the harness can be protected against entry of the seat rails in the event of the collision of the vehicle.

BRIEF DESCRIPTION OF DRAWINGS

FIGS. 9A and 9B are explanatory views illustrating a procedure of demounting the inverter wherein FIG. 9A is an explanatory view illustrating a state before the positioning part of the harness holder is rotated, and FIG. 9B is an explanatory view illustrating a state in which the positioning part of the harness holder is rotated.

DETAILED DESCRIPTION

Figure 1:
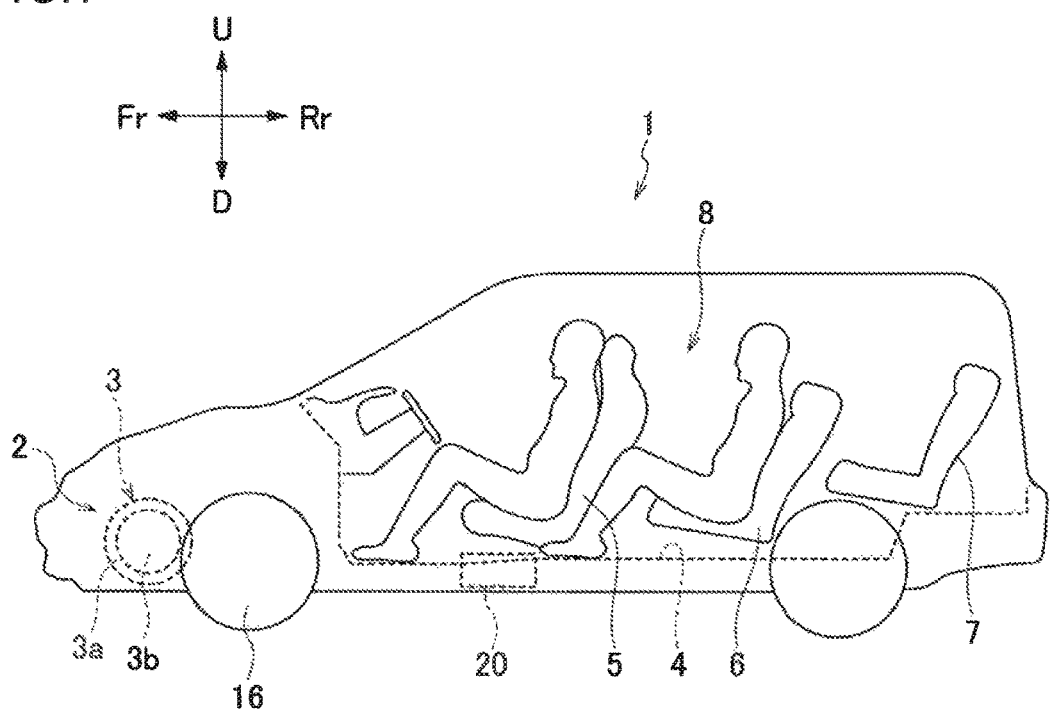
FIG. 1 is a schematic side view illustrating a vehicle having a power equipment unit according to an embodiment of the present invention.

Hereinafter, an embodiment of the present invention will be described in detail with reference to the attached drawings. The drawings shall be viewed in a direction of a reference sign. In the following description, according to a direction viewed from a driver, the front of a vehicle in the drawings is defined as Fr, the rear as Rr, the left as L, the right as R, the upper side as U, and the lower side as D.

In a vehicle 1 as illustrated in FIG. 1, a power unit 3 having an engine 3a and a motor generator 3b installed in series in an engine room 2 in the front of the vehicle. The motor generator 3b is for instance a three-phase alternating current motor. The vehicle 1 is a hybrid vehicle that is driven by the engine 3a and/or the motor generator 3b and can recover power from the motor generator 3b, for instance, during deceleration of the vehicle.

In the vehicle 1, driving forces of the engine 3a and the motor generator 3b are transmitted to front wheels 16 that are driving wheels. When a driving force is transmitted from the front wheels 16 to the motor generator 3b, for instance, during deceleration of the vehicle 1, the motor generator 3b functions as an electric generator to generate a so-called regenerative braking force, and kinetic energy of the vehicle 1 is recovered as electric energy. The recovered electric energy is charged to a battery 50 via an inverter 60 to be described below.

A passenger compartment 8 in which front seats 5, middle seats 6, and rear seats 7 are arranged on a floor panel 4 is provided in the rear of the engine room 2. The passenger compartment 8 is provided in the rear of the engine room 2 that becomes a crushable zone at the time of a head-on collision, and thereby becomes a place that has high safety against a shock at the time of the head-on collision.

Figure 2:
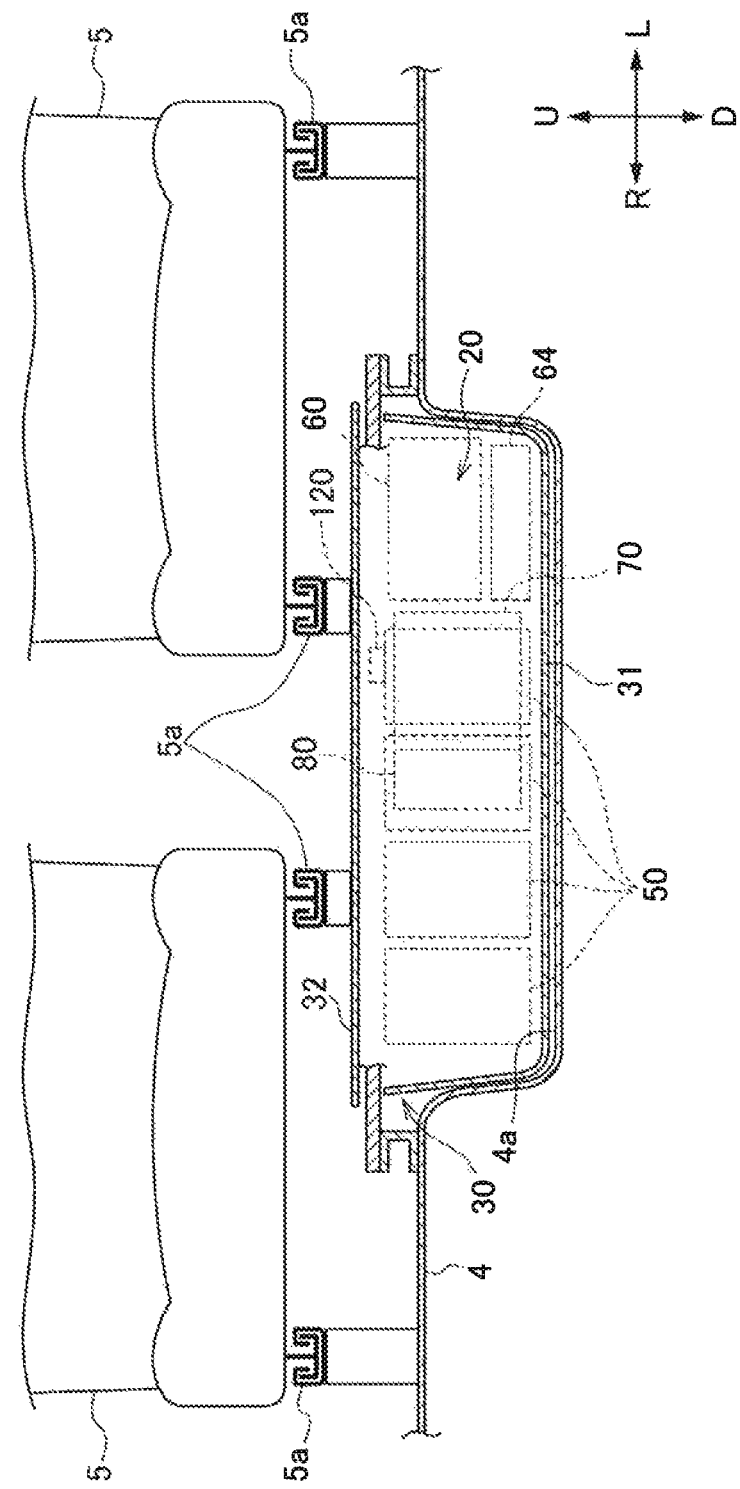
FIG. 2 is a schematic sectional view of main parts of the vehicle illustrating an arrangement of the power equipment unit.

As illustrated in FIGS. 1 and 2, a power equipment unit 20 connected to the power unit 3 via a power cable (not shown) is disposed below the front seats 5 (driver's and front passenger's seats) in the passenger compartment 8. The power equipment unit 20 is housed in a power equipment unit housing 4a formed in a recessed manner in the floor panel 4, and seat rails 5a for adjusting positions of the front seats 5 in a forward/backward direction are arranged above the power equipment unit 20 housed in the power equipment unit housing 4a at predetermined intervals so as to straddle the power equipment unit 20 in the forward/backward direction.

As illustrated in FIGS. 2 to 5, the power equipment unit 20 is a unit that chiefly includes the battery 50, the inverter 60, a DC-DC converter 64, an ECU 70, a junction box 80, wiring 90 electrically connecting them, and a case 30 housing them, and has an air-cooled cooling function of cooling the battery 50, the inverter 60, and the DC-DC converter 64 with air taken in from the passenger compartment 8 and returning the air after the cooling to the passenger compartment 8.

Figure 3:
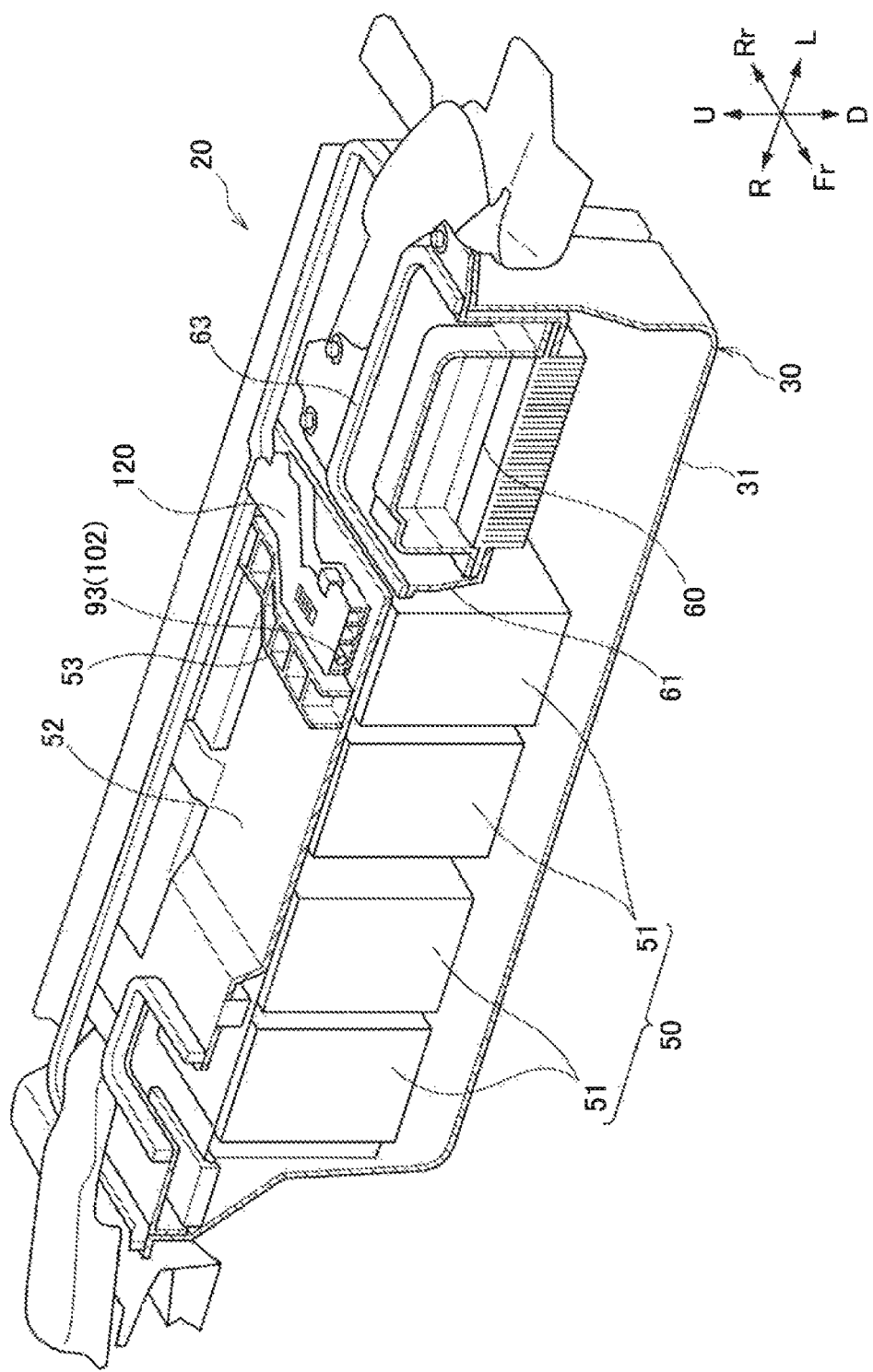
FIG. 3 is a sectional perspective view of the power equipment unit.
Figure 4:
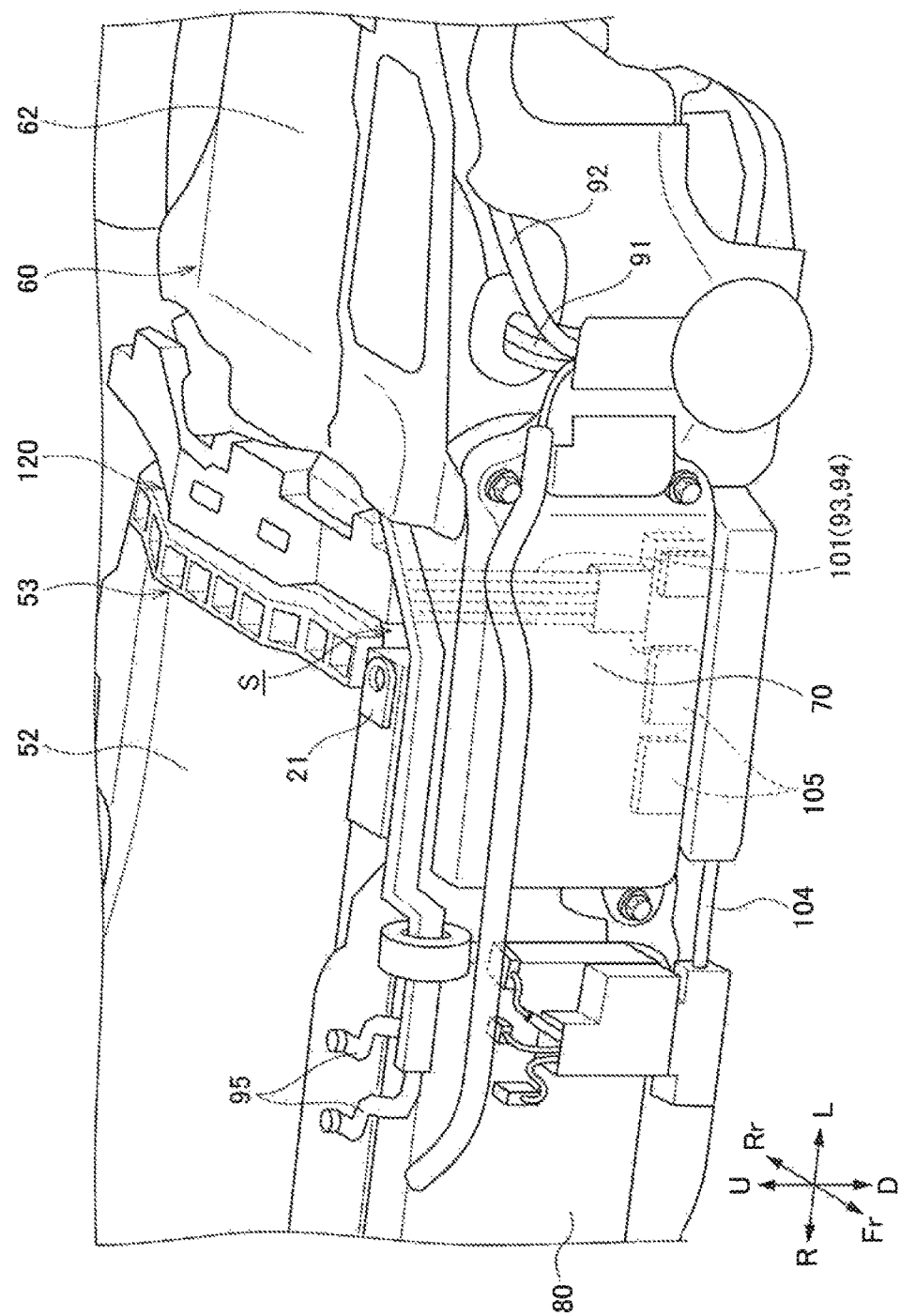
FIG. 4 is a perspective view of illustrating main parts of the power equipment unit.

The case 30 of the power equipment unit 20 includes a case main body 31 having the shape of a bottomed container, and a lid member 32 that covers an upper portion of the case main body 31. As illustrated in FIGS. 3 and 4, the battery 50 and the inverter 60 are disposed inside the case 30 to be adjacent to each other in a leftward/rightward direction, the ECU 70 is disposed in front of the battery 50 to be adjacent to the battery across a space S, and the junction box 80 is disposed in front of the battery 50 to be adjacent to the ECU 70 in the leftward/rightward direction. A maintenance/checkup plug 21 that is a switch for breaking a circuit of the battery 50 to safely do work when maintenance of the battery 50 is performed is provided at a part of the space S. The battery 50 of the present embodiment is made up of four battery modules 51 arranged in parallel in the leftward/rightward direction, but a number and array of the four battery modules 51 constituting the battery 50 can be arbitrarily changed.

The inverter 60 is a power converter that converts power of the battery 50. The inverter 60 converts a direct current obtained from the battery 50 into a three-phase alternating current and supplies the three-phase alternating current to the motor generator 3b, and thereby can drive the motor generator 3b. The inverter 60 converts a regenerative current of the three-phase alternating current obtained from the motor generator 3b into a direct current, and thereby can charge the battery 50. The DC-DC converter 64 that converts a high-voltage direct current obtained from the battery 50 into a low-voltage direct current and supplies the low-voltage direct current to a low-voltage battery (not shown) or the like is disposed below the inverter 60. In FIG. 3, the DC-DC converter 64 is omitted.

The ECU 70 is a controller, and performs charge/discharge control or the like of the battery 50. The battery 50, the inverter 60, the ECU 70, and the junction box 80 are high voltage system equipment that treats the high-voltage current and, even in the case in which the power equipment unit 20 receives a shock in the event of the collision of the vehicle, strength and arrangement thereof are set to be able to withstand the shock. The junction box 80 is a unit for which terminals used for connection, branch, relay, etc., or safeguards such as a fuse are provided.

Figure 5:
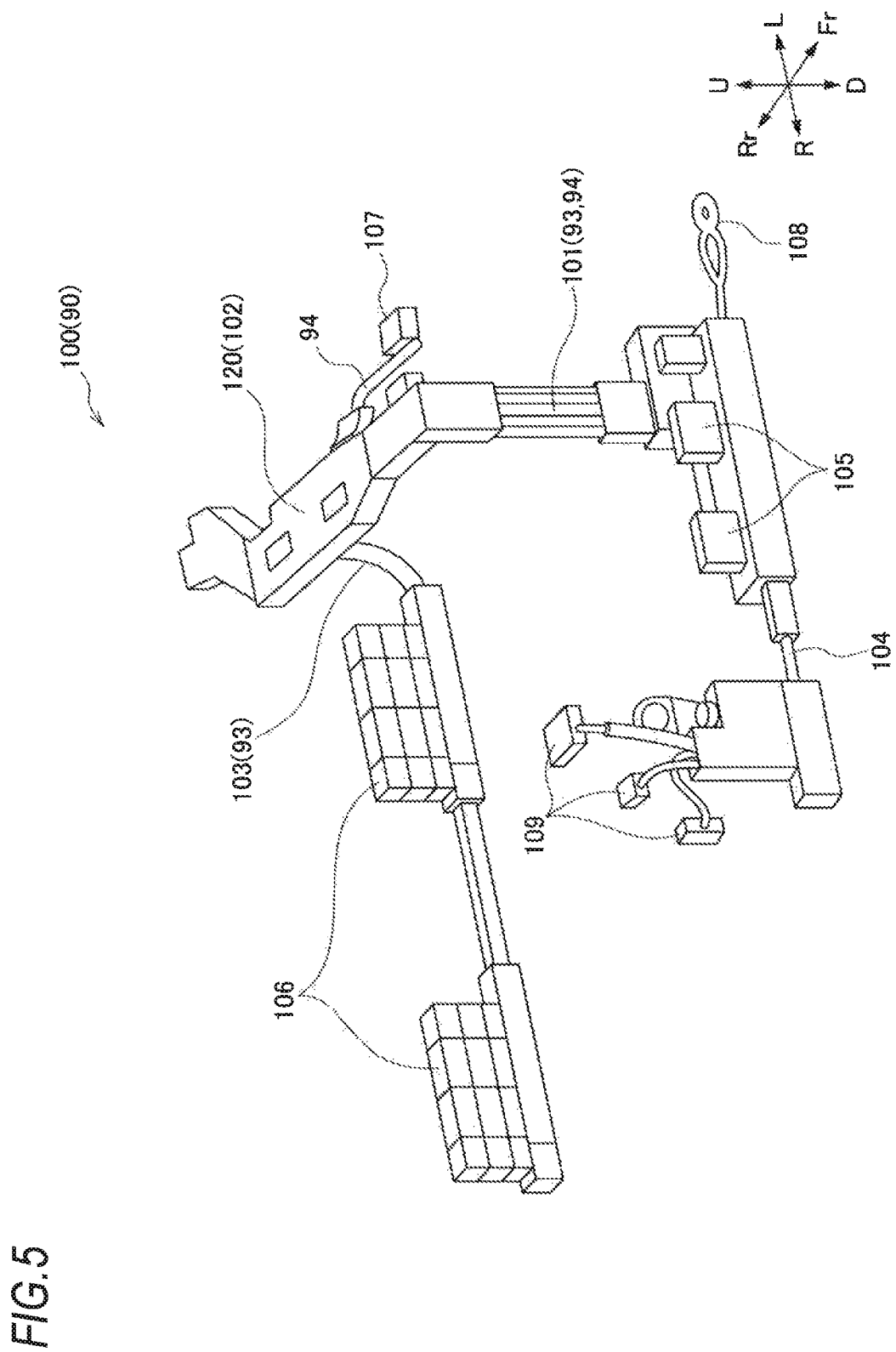
FIG. 5 is a perspective view illustrating a control system harness of the power equipment unit.
Figure 7:
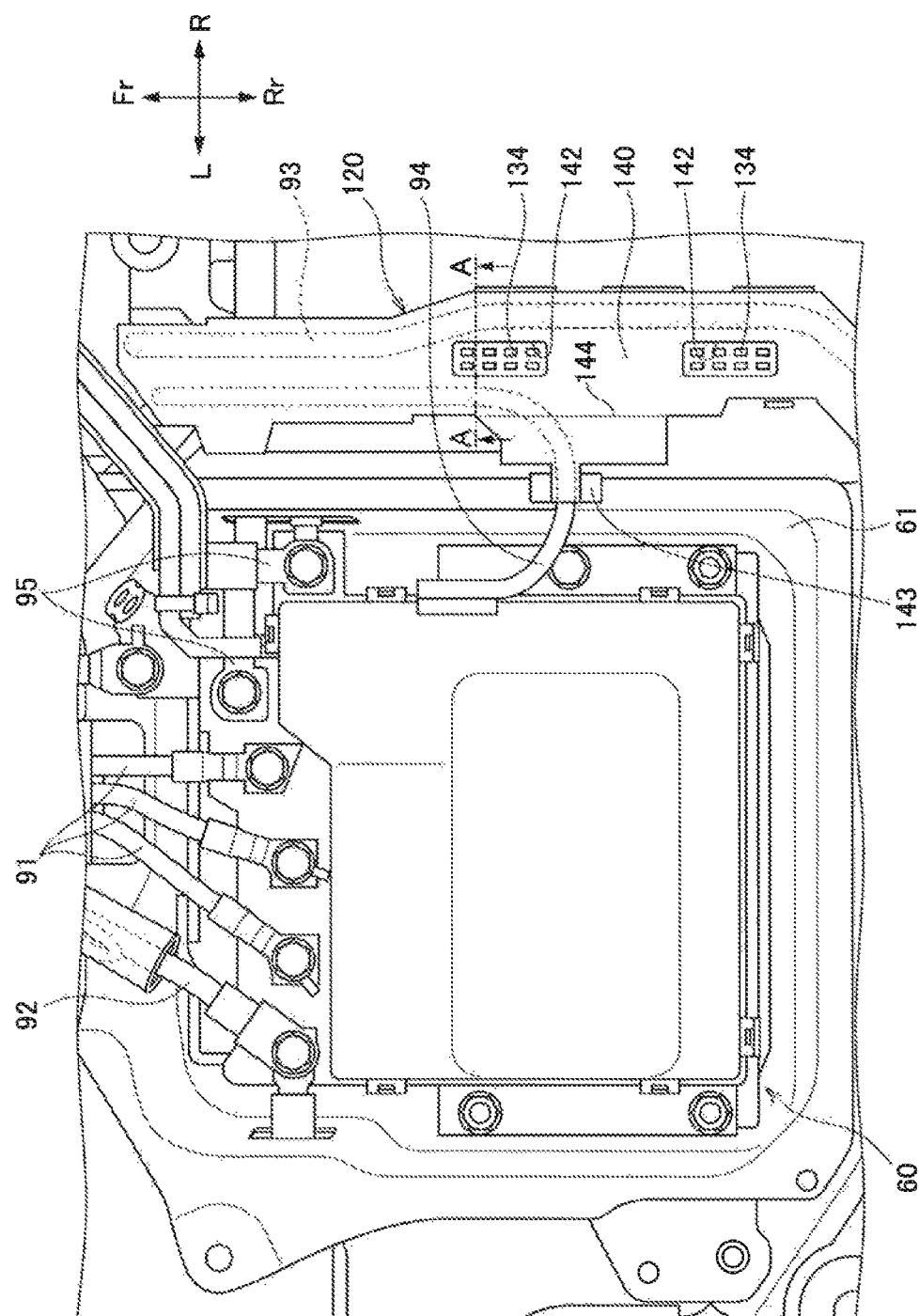
FIG. 7 is a top view of main parts illustrating the harness holder and the inverter (with no cover) of the power equipment unit.

As illustrated in FIGS. 5 and 7, the wiring 90 includes a three-phase line 91 that connects the inverter 60 and the motor generator 3b, a low-voltage line 92 that supplies the low-voltage direct current converted at the DC-DC converter 64 to the ECU 70 or the junction box 80, a battery voltage detection line 93 that connects the battery 50 and the ECU 70, a PCU control line 94 that connects the inverter 60 and the ECU 70, and a high-voltage line 95 that connects the battery 50 and the inverter 60. The battery voltage detection line 93 is a high-voltage line in which no fuse is interposed, and requires strict protection.

As illustrated in FIG. 5, the battery voltage detection line 93 and the PCU control line 94 are formed into an assembly as a control system harness 100. The control system harness 100 includes a first harness part 101 that extends in front of the battery 50 in a vertical direction, a second harness part 102 that extends above the battery 50 in a forward/backward direction, a third harness part 103 that extends at the rear of the battery 50 in the vertical direction, and a fourth harness part 104 that extends below the ECU 70 and the junction box 80 in a leftward/rightward direction.

The control system harness 100 includes an ECU connector 105 that is provided at a lower end side of the first harness part 101 and is connected to the ECU 70 from below, a battery connector 106 that is provided at a lower end side of the third harness part 103 and is connected to the battery 50 from below, a PCU connector 107 that is provided at an intermediate portion of the second harness part 102 and is connected to the inverter 60, a low-voltage line connector 108 that is provided at one end side of the fourth harness part 104 and is connected to the low-voltage line 92, and a J/B connector 109 that is provided at the other end side of the fourth harness part 104 and is connected to the junction box 80. According to the ECU connector 105 and the battery connector 106, they are connected to the ECU 70 and the battery 50 from below, and thus water such as dew drops is prevented from entering the ECU 70 or the battery 50 through the control system harness 100.

That is, the battery voltage detection line 93 is configured such that one end side thereof is connected to the battery 50 from below via the battery connector 106, and the other end side thereof reaches a lower side of the ECU 70 through the third harness part 103, the second harness part 102, and the first harness part 101 and is connected to the ECU 70 from below via the ECU connector 105.

The PCU control line 94 is configured such that one end side thereof is connected to the inverter 60 via the PCU connector 107, and the other end side thereof reaches the lower side of the ECU 70 through the second harness part 102 and the first harness part 101 and is connected to the ECU 70 from below via the ECU connector 105.

The low-voltage line 92 is configured such that one end side thereof is connected to the DC-DC converter 64, and the other end side thereof is connected to the low-voltage line connector 108. The fourth harness part 104 connected to the low-voltage line connector 108 reaches lower sides of the ECU 70 and the junction box 80, and is connected to the ECU 70 and the junction box 80 from below via the ECU connector 105 and the J/B connector 109.

The first harness part 101, the second harness part 102, and the third harness part 103 which the battery voltage detection line 93 in which no fuse is interposed passes need to be protected from the shock in the event of the collision of the vehicle. Especially, the first harness part 101 that is disposed to extend in front of the battery 50 in the vertical direction and is easily affected at the time of head-on collision is required for strict protection.

The first harness part 101 of the present embodiment is disposed to extend through the space S formed between the battery 50 and the ECU 70 in the vertical direction. With this configuration, the first harness part 101 is disposed using the space S between the battery 50 and the ECU 70 provided in places having high safety against the shock in the event of the collision of the vehicle, and thereby the first harness part 101 can be reliably protected from the shock in the event of the collision of the vehicle.

Figure 6:
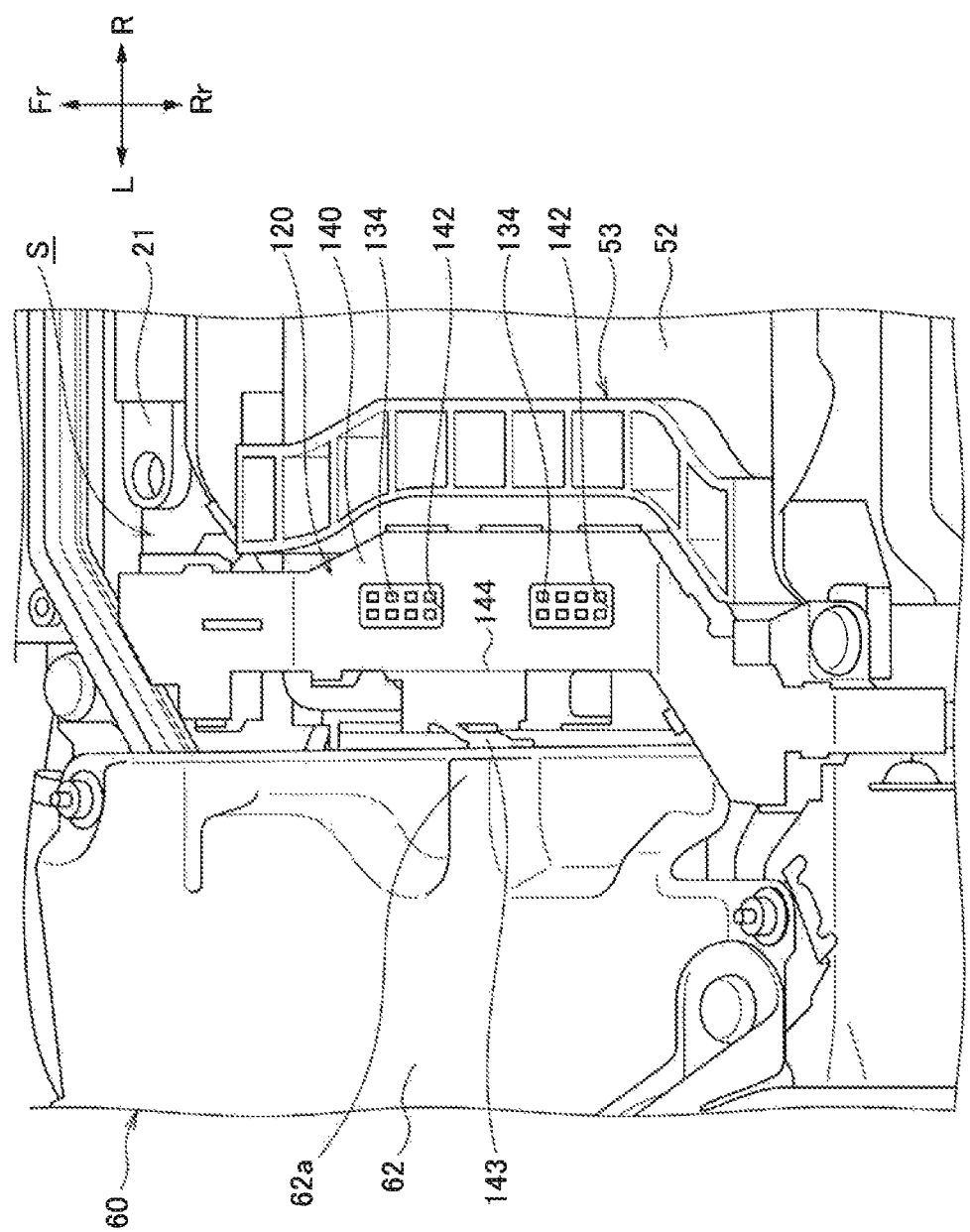
FIG. 6 is a perspective view of main parts illustrating a harness holder and an inverter (with a cover) of the power equipment unit.

The second harness part 102 of the present embodiment is disposed around a border between the battery 50 and the inverter 60. With this configuration, a space existing at the border between the battery 50 and the inverter 60 can be used. The second harness part 102 is disposed on a battery cover covering the battery 50 or a duct member such as an intake duct disposed above the battery 50. In the present embodiment, the second harness part 102 is disposed on the intake duct 52 that supplies cooling air to the battery 50. As illustrated in FIGS. 3, 4 and 6, the intake duct 52 is provided with a high rigidity part 53 that is formed by erecting a plurality of ribs at a position adjacent to the second harness part 102.

However, in the vehicle 1 of the present embodiment, as illustrated in FIG. 2, the border between the battery 50 and the inverter 60 is located below the seat rails 5a. Thus, when the seat rails 5a are intruded into the power equipment unit 20 in the event of the collision of the vehicle, the second harness part 102 may be damaged.

The power equipment unit 20 of the present embodiment includes a harness holder 120 that can protect the second harness part 102 even when the seat rails 5a are intruded thereinto. The harness holder 120 of the present embodiment will be described below with reference to FIGS. 6 to 10.

The harness holder 120 includes a holder main body 130 whose upper portion is open, and a holder cover 140 that covers the upper portion of the holder main body 130. The holder main body 130 integrally has a base 131 and a pair of sidewalls 132 that stand up from opposite ends in a width direction thereof, and the second harness part 102 is housed in a space surrounded with the base 131 and the pair of sidewalls 132. A pullout port 133 for pulling out the PCU control line 94 is formed in the middle of one of the sidewalls 132 in a longitudinal direction, and the PCU control line 94 pulled out from the pullout port 133 is connected to the inverter 60 via the PCU connector 107.

Further, each reinforced part 134 which has a block-shape and which extends upward from the base 131 is integrally provided on the holder main body 130. A width dimension of the reinforced part 134 is set to be as wide as possible within a range in which the housing of the second harness part 102 is not obstructed, and a height dimension of the reinforced part 134 is set to be identical to or higher than that of the sidewall 132. The two reinforced parts 134 are provided on the holder main body 130 of the present embodiment at a predetermined interval in a longitudinal direction, but the number of reinforced parts 134 can be arbitrarily changed.

The holder cover 140 of the present embodiment is formed of a member independent of the holder main body 130, and is mounted on the holder main body 130 to cover the upper portion of the holder main body 130. A plurality of engagement claws 141 that line up at a predetermined interval in a longitudinal direction are integrally provided at opposite ends of the holder cover 140 in a width direction, and these engagement claws 141 are engaged with engagement holes 135 formed at the holder main body 130 side. Thereby, the holder cover 140 is fixed to the holder main body 130.

Further, a plurality of openings 142 through which the reinforced parts 134 of the holder main body 130 pass are formed in the holder cover 140. According to this harness holder 120, a load path along which, while the shock applied from above in the event of the collision of the vehicle is being received by the plurality of reinforced parts 134, the received shock is propagated to, for instance, a holding member of the battery 50 which is a strength component. Thus, even when the seat rails 5a are intruded into the power equipment unit 20, for instance, in the event of the collision of the vehicle, the second harness part 102 housed in the harness holder 120 can be protected, and damage to the second harness part 102 can be prevented.

Figure 8:
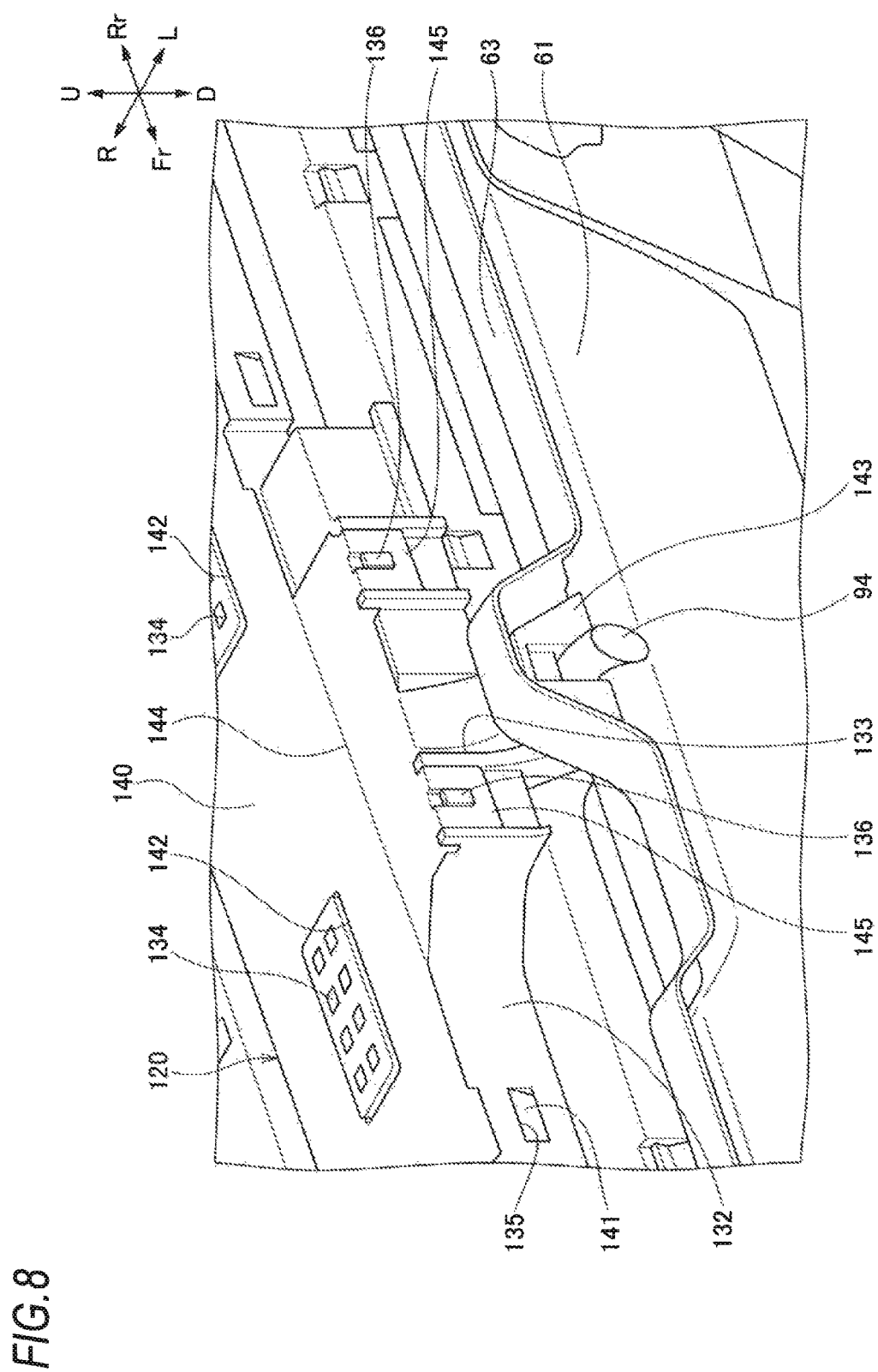
FIG. 8 is a perspective view illustrating a positioning part of the harness holder.

Meanwhile, the PCU control line 94 pulled out from the pullout port 133 of the holder main body 130 is connected to the inverter 60 through a space between a PCU case 61 supporting the inverter 60 and a PCU cover 62 covering an upper side of the inverter 60. As illustrated in FIG. 6, a recess 62a for passing the PCU control line 94 is formed in the PCU cover 62. As illustrated in FIG. 8, a gap between the PCU cover 62 and the PCU case 61 is blocked using a sound-proof sealant 63 for preventing sound leakage from the inverter 60. Therefore, to prevent pinching of the PCU control line 94 caused by the PCU cover 62 or sound-proof sealing failure caused by positional deviation of the PCU control line 94, a pullout position of the PCU control line 94 requires accurate positioning.

Figure 9A:
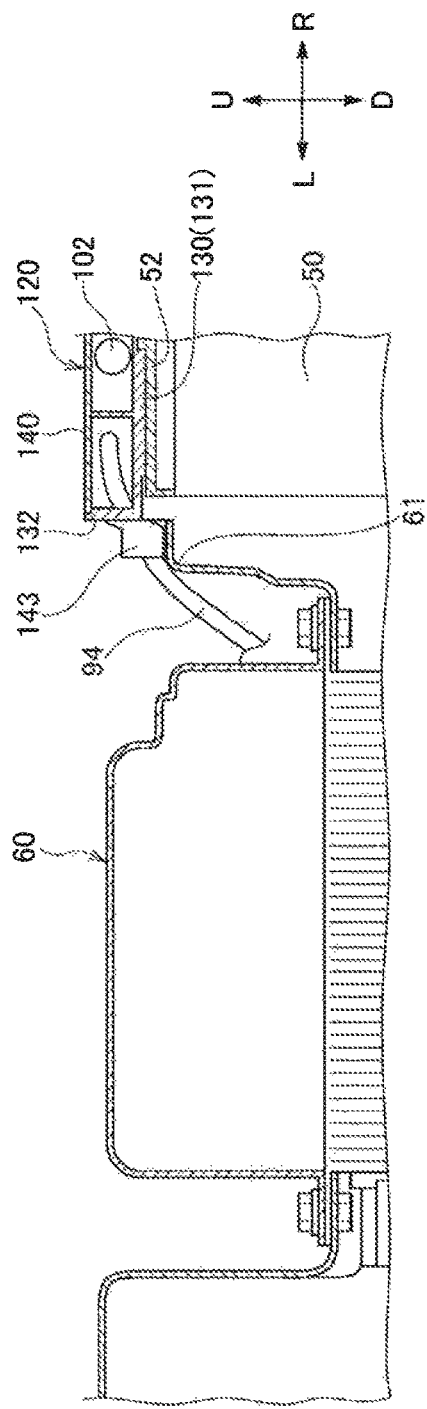

The holder cover 140 includes a positioning part 143 that extends outward from the harness holder 120 to position the PCU control line 94. When viewed in a top view of FIG. 7, the positioning part 143 extends to a position at which it overlaps the PCU case 61 to position the PCU control line 94, and is sandwiched between the PCU cover 62 and the PCU case 61 along with the PCU control line 94. The pinching of the PCU control line 94 caused by the PCU cover 62 or the sound-proof sealing failure caused by the positional deviation of the PCU control line 94 can be reliably prevented. However, to overlap the PCU case 61 in the top view, the removal of the inverter 60 may be obstructed as illustrated in FIG. 9A.

Figure 9B:
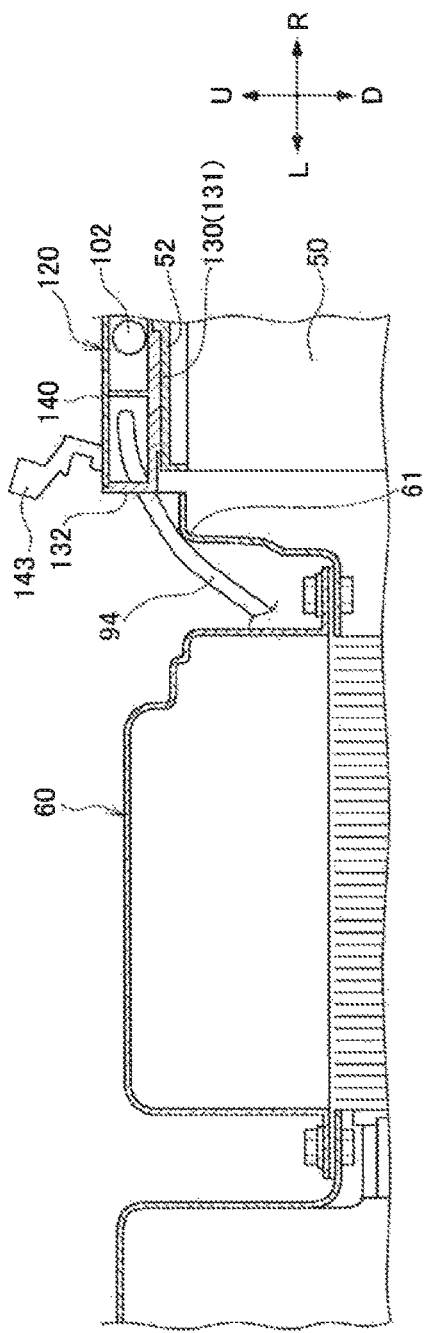
Figure 10:
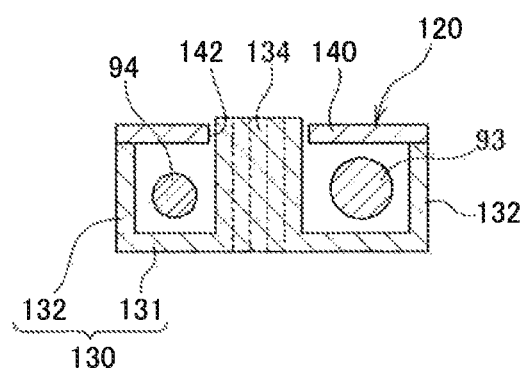
FIG. 10 is a sectional view taken along line A-A of FIG. 7.

As illustrated in FIG. 9B, the positioning part 143 can be rotated relative to the holder cover 140, and is evacuated from an upper side of the PCU case 61 by this rotation. Thereby, even when the entire harness holder 120 is not removed, the inverter 60 can be removed. To be specific, the positioning part 143 of the present embodiment is connected to the holder cover 140 via a bent part 144 that can be bent. Due to rotation obtained using the bent part 144 as a fulcrum, a positioning posture in which the PCU control line 94 is positioned and a jumping posture in which the positioning part 143 is jumped up from the positioning position are switched. The positioning part 143 is provided with engagement segments 145 that are engaged with the engagement claws 136 adjacent to the holder main body 130. When the engagement segments 145 are disengaged, posture switching of the positioning part 143 from the positioning posture to the jumping position is allowed.

As described above, according to the harness holder 120 of the present embodiment, the reinforced parts 134 extending upward from the base 131 are integrally provided on the holder main body 130, and the holder cover 140 has the openings 142 through which the reinforced parts 134 pass. Thus, while the shock in the event of the collision of the vehicle is being received by the reinforced parts 134, the received shock is propagated to, for instance, the holding member of the battery 50 which is the strength component. Thereby, the second harness part 102 housed in the harness holder 120 can be protected, and the damage to the second harness part 102 can be prevented. Tops of the reinforced parts 134 have higher positions than the holder cover 140, and thereby the shock in the event of the collision of the vehicle can be received by the reinforced parts 134 ahead of the holder cover 140.

The holder cover 140 has the positioning part 143 that extends outward from the harness holder 120 to position the PCU control line 94, and the positioning part 143 can be rotated relative to the holder cover 140. Thus, the positioning part 143 is merely rotated without removing the entire harness holder 120, and thereby the inverter 60 that is a connection counterpart of the PCU control line 94 can be removed.

In the power equipment unit 20, since the harness holder 120 is disposed around the border between the battery 50 and the inverter 60 to extend in a direction perpendicular to an arranging direction of the battery 50 and the inverter 60, the harness holder 120 can be disposed by effectively using the space inside the power equipment unit 20.

In the vehicle 1, the power equipment unit 20 is housed in the power equipment unit housing 4a formed in a recessed manner in the floor panel 4, and the power equipment unit housing 4a is provided below the front seats 5. Thus, the power equipment unit 20 is disposed inside the passenger compartment 8 for which collision protection is considered, so that the battery 50 or the control system harness 100 inside the power equipment unit 20 can be reliably protected.

In the vehicle 1, since the harness holder 120 is disposed below the seat rails 5a of the front seats 5, the second harness part 102 can be protected against entry of the seat rails 5a in the event of the collision of the vehicle.

The present invention is not limited to the above embodiment, and can be appropriately modified and improved.

For example, in the embodiment, the power equipment unit 20 is disposed below the front seats 5, but without being limited thereto, the power equipment unit 20 may be disposed below the middle seats 6 or the rear seats 7.

The hybrid vehicle is exemplified as the vehicle 1, but without being limited thereto, an electric vehicle, a fuel cell vehicle, or the like may be used.

The invention claimed is:

1. A power equipment unit comprising:
   a power equipment which supplies electric power to a motor;
   a controller which controls the power equipment; and
   a harness which connects the power equipment and the controller,
   wherein a part of the harness is housed in a harness holder, and the harness holder comprises:
     a holder main body whose upper portion is open;
     a reinforced part which is integrally provided on the holder main body and which extends from a bottom of the holder main body toward the upper portion thereof; and
     a holder cover which covers the upper portion of the holder main body and which has an opening through which the reinforced part passes,
   wherein a power converter which converts the electric power of the power equipment is disposed to be adjacent to the power equipment, and
   wherein the harness holder is disposed around a border between the power equipment and the power converter to extend in a direction perpendicular to an arranging direction of the power equipment and the power converter.

2. The power equipment unit according to claim 1, wherein
   the harness holder is disposed above the power equipment,
   a control line which is connected to the power converter is housed in the harness holder,
   the holder cover has a positioning part that positions the control line with respect to the power converter, and
   the positioning part is rotatable relative to the holder cover.

3. A vehicle in which the power equipment unit according to claim 1 is mounted, wherein
   the power equipment unit is housed in a power equipment unit housing which is formed in a recessed manner in a floor panel, and
   the power equipment unit housing is provided below a seat.

4. The vehicle according to claim 3,
   wherein the harness holder is disposed below seat rails of the seat.

* * * * *